Oct. 8, 1968 N. B. STEVENS ET AL 3,405,273

DETECTOR ARRANGEMENT HAVING A COLLECTOR WITH ELECTRICALLY INSULATING POROUS MATERIAL THEREON

Filed May 2, 1966

Norman B. Stevens,
Walter J. Colton,
INVENTORS.
BY.
[signature]
ATTORNEY.

United States Patent Office
3,405,273
Patented Oct. 8, 1968

3,405,273
DETECTOR ARRANGEMENT HAVING A COLLECTOR WITH ELECTRICALLY INSULATING POROUS MATERIAL THEREON

Norman B. Stevens and Walter J. Colton, Santa Barbara, Calif., assignors to Santa Barbara Research Center, Goleta, Calif., a corporation of California
Filed May 2, 1966, Ser. No. 546,976
4 Claims. (Cl. 250—83.3)

ABSTRACT OF THE DISCLOSURE

A radiation detector arrangement is disclosed comprising a cold sink having a cavity therein. A thin film of electrically insulating and thermally conducting material is applied to the cold sink and spans the cavity. A radiation collector is supported by the film overlying the cavity and has thermoelectric materials directly connected to opposed ends thereof, said thermoelectric materials being thermally joined to the sink to maintain cold junction temperature. A porous electrically insulating material is deposited on the collector to aid in radiation capture.

The invention relates to a device useful in the detection of infrared radiation generally and particularly to a structure of the thermovoltaic type having a sensitive or "hot" junction which demonstrates isothermal characteristics in operation. Additionally, the invention provides an improved blackening structure which has the effect of increasing the sensitivity of the device to radiation.

Many types of infrared detection devices have been recently developed in the art and have been the subject of extensive investigation from the standpoint of field application. Certain structures effective in sensing infrared radiation required, for efficient and effective operation, that they be maintained in an ambient condition at extremely low cryogenic temperatures. Needless to say, such detection arrangements are expensive in initial cost and uneconomical in operation. Many of such devices have the further disadvantage in that they are only sensitive to radiation influence in rather narrow spectral bands. Their utility, therefore, in general application is limited. In other prior art detectors it is necessary to provide the structure with an operating bias of some type. For example, photoconductors employ a bias in the form of direct current passed through the element. The bias must be known to determine the operational characteristics of the device which are physically related to the magnitude of the bias.

For the purpose of this description devices of the type hereunder consideration will be referred to as "thermopiles." Characteristically, a thermopile comprises a sensitive element commonly known as the "hot" junction, which generates a voltage with respect to a cold junction, physically connected to the hot junction, and located in a thermally stable condition when the temperature of the hot junction is raised as a result of incoming radiation. Typically, prior art thermopiles used various metallic materials which in historic experience demonstrated thermoelectric power. This power may be an empirically determined constant which represents voltage generated per degree of temperature variation for the particular thermoelectric materials employed. For example, bismuth and antimony, efficient thermoelectric materials, have a power constant of $10^{-4}$ volts per degree centigrade. Utilizing this constant for a given pair of thermoelectric metals the voltage generated in the thermopile will be related to the product of thermoelectric power and the relative temperature rise of the hot junction with reference to the thermally stable cold junction in response to radiation impinged upon the hot junction.

In evaluating thermopiles, generally, certain physical and performance characteristics or parameters of the pile provide the best mode of determining the utility in operational situs. To avoid confusion that has heretofore existed in this art, the term "sensitivity" with reference to received radiation and output signal cannot be generally applied without an understanding of other operational parameters. The term sensitivity, therefore, includes such parameters as responsivity which represents a factor identifying the voltage output for a given power of received radiation. In effect, this parameter identifies the efficiency with which a given thermopile device converts received radiation to electrical voltage. Time is another aspect of overall or ultimate thermopile sensitivity which aids in determining the utility of a particular structure. In effect, a "time constant" may be determined for a given thermopile structure which reflects the rapidity with which a given pulse of received radiation is converted to an electrical voltage output signal.

Certain physical characteristics additionally affect the utility of the device, one of which is the dimensional characteristic of the "hot" junction or, more particularly, the sensitive area thereof. Desirably, the sensitive area is accurately dimensionally defined and responds relatively uniformly to the received radiation without regard to the point of impingement of the radiation. Another aspect of physical characteristic relates to the mechanical structure of the thermopile. Again, desirably, the device will not be fragile and will demonstrate an ability to withstand physical force applied either gradually or by impact. In addition to this desirable ruggedness, the structure should resist resonant movement in response to frequencies in the determined range of operation so that such vibration will not induce extra noise into the system which would seriously limit the effectiveness of the device.

Since in ultimate application thermopile detectors may have useful application under a wide variety of ambient temperature conditions, it is also desirable that they withstand opposed temperature extremes. The ability, therefore, of the device to survive extremes in low and high temperature, without impairment of functional characteristics, greatly increases its useful operation.

It has been well known that the usefulness of thermopiles and the efficiency thereof may be increased by blackening the surface of the hot junction. As a result reflection is lowered and an increased amount of radiation is absorbed. Perfect absorption is known as the "black body" effect. Gold black has been used for such coating. However, certain difficulties with gold blacked thermopile surfaces have been noted in use. For example, physical contact frequently causes flaking and the like. This lack of ruggedness reduces thermopile efficiency. A further practical difficulty in multiple element arrays is that the gold black must be carefully applied to each collector surface to avoid overlapping with adjacent collector surfaces which could result in electrical short therebetween, thus minimizing the efficiency of the entire thermopile.

Prior art thermopiles have been characterized generally by the use of materials having thermoelectric power which define a hot junction which consists of the physical overlapping of the two materials in a determined area. In addition to physical contact, some structures utilize the physical admixture or amalgam of the two materials in the hot junction area. The opposed ends of the thermoelectric materials were, of course, physically and thermally connected to a cold junction which provided the relatively stabe thermal base. Electrical leads were connected to the terminus of the thermoelectric materials which received the generated output voltage. In practical operation the leads were usually connected to an electrical measuring device or sometimes operationally cascaded with appropriate amplifiers to increase the level of output signal and thereby increase its sensitivity.

Devices employing such structure suffered certain operational difficulties due to the fact that the sensitive area of the hot junction was not clearly defined which made it difficult for the sensitive area to respond isothermally to the received radiation. The term "isothermal response" will herein be considered to mean that a physically determinable sensitive area uniformly responds to received radiation with a uniform temperature rise throughout its physical dimension.

The output of the sensitive area of any thermopile will be influenced by factors other than the received radiation. In their useful application, the device must operate in some ambient temperature condition above absolute zero and this temperature level is productive of certain background noises incident in the device. This is sometimes referred to in the art as "Johnson noise" and is inherent in molecular agitation resulting from the thermal condition of the sensitive area in response to ambient temperature level or conditions other than the received radiation. It will be apparent, therefore, that the effectiveness of thermopile devices may be limited by the presence of these extraneous noise considerations and the difficulty inherent in distinguishing the measured radiant energy from the background noise.

Accordingly, it is a primary object of the invention to provide a highly sensitive thermopile structure demonstrating a high level of responsivity with a relatively short time constant.

It is a further object of the invention to provide a thermopile type infrared detector arrangement which may operate under a wide range of ambient temperature and vibration conditions without employing complicated cooling equipment and which responds to radiation without the necessity of a biasing standard.

It is yet a further object of the invention to provide a thermopile having a radiation-sensitive area or collector having specific and determinable dimensional characteristics.

It is yet a further object of the invention to provide a thermopile of the type described wherein the collector or radiation-sensitive area responds isothermally to the impact of received radiation.

It is a further object of the invention to provide a thermopile arrangement having a radiation-sensitive area approaching black body characteristics to thereby increase the efficiency with which infrared radiation is received.

This last-mentioned object is achieved by the evaporative positioning on the collector surface of an electrical nonconducting material that may overlie a plurality of adjacent collector surfaces without inducing electrical short therebetween.

It is a further specific object of the invention to provide a black surface of the type described which is mechanically rugged and adheres well to the collector surface. Specifically, the present invention provides for the disposition on the thermopile surface of a porous coating of bismuth oxide and a mode of its application is herein suggested.

It is another object of the invention to provide a highly sensitive thermopile structure providing high responsivity and low time constant yet adaptable to a high degree of miniaturization.

It is yet a further object of the invention to provide a thermopile structure wherein a plurality of sensitive areas are arranged in series relationship with resultant increased voltage output bringing the latter to a level which, with available amplifying equipment, demonstrates a high responsivity and accuracy of response to received radiation with reference to background noise inherent in the system.

These and other objects and features of the invention are apparent in the course of the following description and from an examination of the related drawings.

Figure 1:
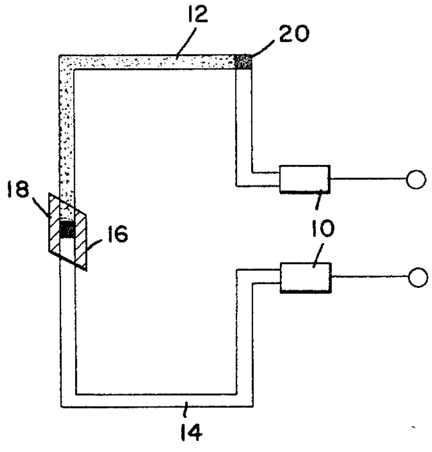
FIG. 1 is a schematic view of a typical prior art thermopile arrangement.

Describing the invention in detail, attention is directed to FIG. 1, a schematic illustration of a typical prior art thermopile. A pair of output leads 10, 10 are electrically associated with appropriate metallic segments 12 and 14, the latter comprising material having thermoelectric power. The segments 12 and 14 may be any of the typical metals so used such as bismuth and antimony. The metals are physically joined in an area 16 which may be defined as the hot junction of the thermopile. To aid in the reception of infrared radiation, it has been conventional to blacken the sensitive area 18 of the hot junction 16. In operation, the sensitive area 18 of the hot junction 16 generates a voltage with respect to a cold junction 20, the latter being thermally stable at a relatively fixed temperature when the sensitive area 18 is heated by incoming radiation. Typically, the electrical output at leads 10, 10 is proportional to the degree of heating which in turn is directly related to the total radiation input on the sensitive area 18.

Figure 2:
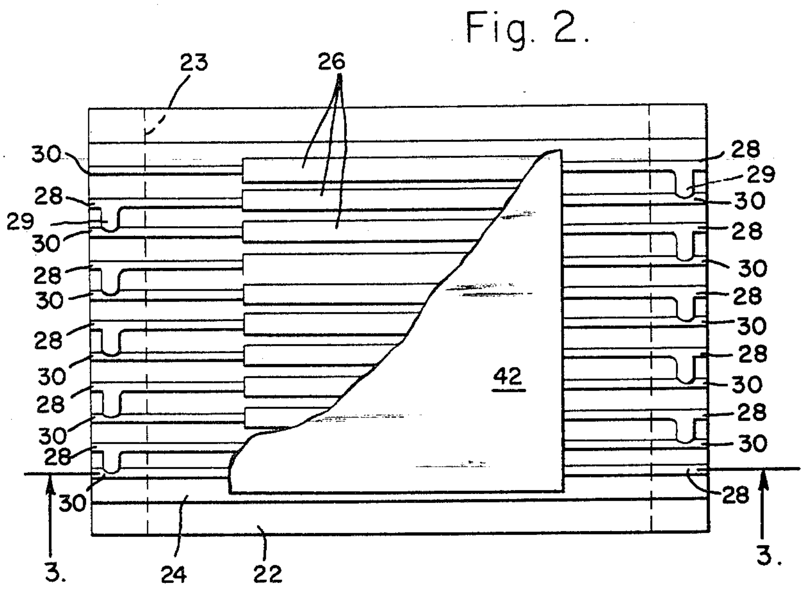
FIG. 2 is a plan view of a multi-array thermopile arrangement incorporating the arrangement.
Figure 3:
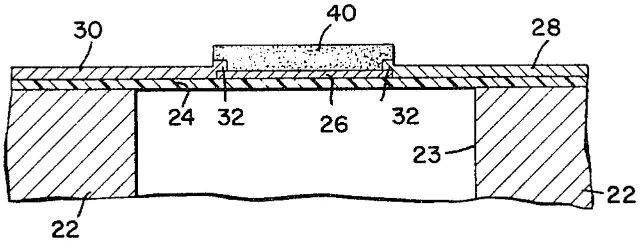
FIG. 3 is a fragmentary sectional view taken along line 3—3 of FIG. 2.

With this background in mind, attention is directed to FIGS. 2 and 3 which illustrate a thermopile arrangement embodying the present invention. Physically, the thermopile comprises a cold sink 22 defining, centrally thereof, a cavity 23. The cold sink 22 is preferably formed from a material that is highly thermally conductive and comprises a relatively large mass as compared to the other elements of the pile hereinafter described. As is shown in FIG. 3, a supporting film 24 is positioned over the surfaces of the cold sink and the central cavity 23 of the sink. A suitable material for the supporting film 24 has been found to be aluminum oxide in that it may be readily positioned and affixed to the cavity-defining segments of the cold sink by epoxies or other adhesive resins. Additionally, aluminum oxide supporting film may be extremely thin, of, for example, an order of 1000 Angstroms. In spite of this relative thinness, the aluminum oxide film provides the desired mechanical strength necessary for a durable and shock resistant detector arrangement. Additionally, aluminum oxide supporting film may be extreme'y the cold sink from the balance of the thermopile yet maintains thermal contact therebetween.

The unique structure disclosed is a thermopile composed of relatively thin segments. Thus, the desirable isothermal characteristic of the pile is achieved. Accordingly, the present invention utilizes evaporative techniques to position the various thermopile components.

With the film 24 in position on the cold sink, a photoetched mask is positioned over the supporting film 24 and defines thereon an open area coextensive with the sensitive area or collector 26. A conventional evaporative operation is then utilized to position a thin film of highly conductive material such as silver or gold which comprises the collector 26. The photo-etch and evaporative technique sharply defines the physical dimensions of the collector 26. Subsequently, the collector 26 and one section of the film 24 is again masked and a first thermoelectric material 28 is evaporatively deposited on the left-hand surface of supporting film 24 and in thermal contact with the adjacent portion of the cold sink 22. Thereafter, a second mask is positioned to cover the collector 26, the first thermoelectric material 28 and a second thermoelectric material 30 is deposited on another segment of the film 24 and in thermal contact with the adjacent section of the cold sink 22. Upon completion, the thermopile structure comprises, in electrical series, thermoelectric material 28, collector material 26 and thermoelectric material 30. It has been found that desirable operating characteristics are achieved when the collector material 26 is of an order of thickness of approximately 500 angstroms while the respective thermoelectric materials are of an order of thickness of approximately 3000–4000 angstroms. Additionally, a good electrical bond is provided at 32 and 34 between the collector mateiial 26 and the respective thermoelectric materials 28 and 30.

Directing attention to FIG. 2, it will be seen that the preferred structure provides a composite thermopile unit that is composed of a plurality of individual thermopile elements in electrical series relationship. The composite array, therefore, comprises sensitive collector elements 26, 26 each communicating with respective portions of the cold sink by segments of different thermoelectric materials 28, 28 and 30, 30. It will also be noted that adjacent segments 28 and 30 on each side of the central collectors 26 are electrically interlocked by evaporated bulges 29, 29. The arrangement thus provides a plurality of thermopile elements in electrical series so that the total output voltage represents the summation of the voltage generated in each element of the array and therefore substantially increases the responsivity of the entire pile.

While satisfactory results have been obtained utilizing collectors formed with gold or silver and employing conventional thermoelectric materials 30 and 28, such as bismuth and antimony, respectively, it will be understood that any highly thermally conductive material may be utilized for the collectors and other historically sound materials having a high thermoelectric power may be employed with satisfactory results. Additionally, copper or aluminum has been found to provide a satisfactory cold sink.

Over each silver collector surface 26 a porous coating of bismuth material 40 is positioned. The bismuth material selected has been found, when applied to the surface of the collector 26 in the manner described, to provide a somewhat particled porous surface material efficiently capturing virtually all of the infrared radiation received. The black body condition is approached when the material is so applied. It has additional advantages in that it is mechanically stable and adheres well to the surface of the collector adding to the ruggedness of the entire unit.

Generally, the material exhibits relatively uniform spectral absorption properties well into the infrared range. The bismuth material, as herein applied, is electrically nonconductive and accordingly may be placed, as is shown at 40 in FIG. 2, over all of the detector areas without inducing electrical short therebetween. The material is therefore suitable for use in multi-element array thermopile arrangements. It is believed that the porous bismuth material comprises a multiplicity of particles each being surface coated with oxide of bismuth. Thus, the material is an effective insulator and electrically nonconductive.

A suggested method of applying the bismuth oxide coating 40 to the collector 26 is to position the collector within a vacuum chamber so that it may be physically moved from the outside of the chamber by any suitable mechanical device. A small metal dish is provided in the base of the vacuum chamber and bismuth metal is positioned in the dish directly below the surface of the thermopile. The majority of the air is evacuated from the vacuum chamber down to a pressure below 10 millimeters of mercury. At this pressure residual oxygen is still present in the chamber. The bismuth is head and a bismuth smoke is produced which rises and engages the surface of the thermopile. The small particles described above adhere to the thermopile surface. It has been found that in approximately 1–20 seconds a relatively uniform porous deposit is disposed on the thermopile surface. A thickness of about 20 microns is generally satisfactory.

The bismuth material, in addition to being electrically nonconductive, is highly thermally conductive and it has been found that infrared radiation captured in the bismuth material surface is quickly thermally transferred to the silver collector thus providing a relatively good time constant for the thermopile structure described.

In the operation, it has been found that the relatively thin highly thermally conductive collector, when exposed to radiation, presents a desirable isothermal characteristic. That is, the entire collector 26 after receiving an appropriate radiation pulse is uniformly elevated in temperature throughout its entire body in a relatively short time period. This isothermal spatial uniformity provides an electrical output signal directly and more accurately responsive to the energy level of the received radiation.

The arrangement disclosed provides a structural thermopile readily compatible with device miniaturization, provides a high responsivity factor with a low time constant and is particularly useful in obtaining precise repeatable temperature measurements under ambient conditions without the complication inherent in super-cooled and biased infrared detectors. The combination additionally has been found to be structurally sound and highly resistant to mechanical shock and the like.

The invention as disclosed is by way of illustration and not limitation and may be modified in various particulars all within the scope of the appended claims.

What is claimed is:

1. In a radiation detector, a thermal sink having a cavity therein, a thin supporting film carried by the sink and spanning the cavity, electrically conductive radiation collector means carried by the film and overlying the cavity, a first thermoelectric material means carried by the film and having one end physically connected to the collector means and the other end thermally joined to the sink, a second thermoelectric material means carried by the film and having one end physically joined to the collector means and the other end thermally joined to the sink, said film providing electrical insulation between the respective means and the sink, the collector means having an exposed radiation receiving surface covered with an adhering porous layer of electrically insulating material, said electrically insulating material being thermally bonded to said collector means surface whereby energy received on said porous layer is thermally transferred to said collector means, and electrical lead means electrically joined to the material means.

2. A radiation detector according to claim 1, wherein said porous material comprising fine particles having an insulating layer surrounding each particle.

3. A radiation detector according to claim 2, wherein said fine particles are bismuth surface coated with bismuth oxide.

4. A radiation detector according to claim 3, wherein said collector means comprises a plurality of elements carried by the film adjacent to each other, the respective material means comprising first segments and second segments respectively joined to the respective elements, certain of said first and second segments being physically joined to connect the respective elements in electrical series relationship.

References Cited

UNITED STATES PATENTS

| | | | |
|---|---|---|---|
| 2,671,818 | 3/1954 | Turck | 136—216 |
| 3,075,386 | 1/1963 | Daly | 338—18 |
| 3,092,997 | 6/1963 | Gaskill | 250—83.3 |

RALPH G. NILSON, *Primary Examiner.*

M. J. FROME, *Assistant Examiner.*

UNITED STATES PATENT OFFICE
CERTIFICATE OF CORRECTION

Patent No. 3,405,273

October 8, 1968

Norman B. Stevens et al.

It is certified that error appears in the above identified patent and that said Letters Patent are hereby corrected as shown below:

Column 2, line 69, "stabe" should read -- stable --. Column 4, line 44, "aluminum oxide supporting film may be extreme'y" should read -- the aluminum oxide film electrically insulates --. Column 5, line 63, "head" should read -- heated --.

Signed and sealed this 10th day of March 1970.

(SEAL)
Attest:

Edward M. Fletcher, Jr.
Attesting Officer

WILLIAM E. SCHUYLER, JR.
Commissioner of Patents